United States Patent
Boese et al.

(10) Patent No.: US 7,844,132 B2
(45) Date of Patent: Nov. 30, 2010

(54) METHOD FOR DETERMINING A TRANSFORMATION OF COORDINATES OF DIFFERENT IMAGES OF AN OBJECT

(75) Inventors: Jan Boese, Eckental (DE); Martin Kleen, Furth (DE); Norbert Rahn, Forchheim (DE)

(73) Assignee: Siemens Aktiengesellschaft, Munich (DE)

(*) Notice: Subject to any disclaimer, the term of this patent is extended or adjusted under 35 U.S.C. 154(b) by 1000 days.

(21) Appl. No.: 11/631,769

(22) PCT Filed: Jul. 5, 2005

(86) PCT No.: PCT/EP2005/053201

§ 371 (c)(1),
(2), (4) Date: Jan. 5, 2007

(87) PCT Pub. No.: WO2006/003203

PCT Pub. Date: Jan. 12, 2006

(65) Prior Publication Data

US 2008/0044105 A1    Feb. 21, 2008

(30) Foreign Application Priority Data

Jul. 7, 2004    (DE) .................. 10 2004 032 914

(51) Int. Cl.
G06K 9/32 (2006.01)
G06K 9/36 (2006.01)

(52) U.S. Cl. .................. 382/294; 382/276

(58) Field of Classification Search .................. 382/276, 382/278, 287, 294, 302, 303, 305, 312; 375/240.18; 358/1.2; 345/645; 600/411
See application file for complete search history.

(56) References Cited

U.S. PATENT DOCUMENTS

| | | | | |
|---|---|---|---|---|
| 5,568,384 A | * | 10/1996 | Robb et al. .................. 715/202 |
| 6,016,439 A | * | 1/2000 | Acker .......................... 600/411 |
| 6,226,418 B1 | * | 5/2001 | Miller et al. ................. 382/294 |
| 6,359,959 B1 | * | 3/2002 | Butler et al. .................. 378/20 |
| 7,280,710 B1 | * | 10/2007 | Castro-Pareja et al. ....... 382/303 |
| 2003/0146913 A1 | | 8/2003 | Shen et al. | |

FOREIGN PATENT DOCUMENTS

WO    WO 03/024184 A2    3/2003

OTHER PUBLICATIONS

C. Fookes et al., "Global 3D rigid registration of medical images", Image Processing, 2000, Proceedings 2000 International Confernce on Sep. 10-13, 2000, Piscataway, NJ, USA, IEEE, vol. 2, Sep. 10, 2000, pp. 447-450, XP010530019, Abstract.

S.Lavallee et al., "Matching 3-D Smooth Surfaces with their 2-D Projections Using 3-D Distance Maps", Geometric Reasoning for Perception and Action Workshop, 1993, pp. 217-238, XP000922563.

(Continued)

*Primary Examiner*—Kanji Patel

(57) ABSTRACT

Disclosed is a method for registering images of an object according to which a landmark that is common to the images is first identified, and the transformations in relation to the remaining degrees of freedom are determined by means of a position alignment that is not based on the landmark.

16 Claims, 2 Drawing Sheets

OTHER PUBLICATIONS

Margrit Betke, Harrison Hong, Jane P. Ko, "Automatic 3D Registration of Lung Surfaces in Computer Tomography Scans", Boston University, Computer Science, Technical Report 2001-004, Apr. 24, 2001, pp. 1-16.

Calvin R. Maurer, Jr., Robert J. Maciunas, J. Michael Fitzpatrick, "Registration of Head CT Images to Physical Space Using a Weighted Combination of Points and Surfaces", IEEE Transactions on Medical Imaging, Oct. 1998, pp. 753-761, vol. 17, No. 5.

Brian J. McParland, J. Carl Kumaradas, "Digital Portal Image Registration by Sequential Anatomical Matchpoint and image Correlations for Real-Time Continuous field Alignment Verification", Medical Physics, Jul. 1995, pp. 1063-1075, vol. 22, No. 7.

* cited by examiner

METHOD FOR DETERMINING A TRANSFORMATION OF COORDINATES OF DIFFERENT IMAGES OF AN OBJECT

CROSS REFERENCE TO RELATED APPLICATIONS

This application is the US National Stage of International Application No. PCT/EP2005/053201 filed Jul. 5, 2005 and claims the benefits thereof. The International Application claims the benefits of German application No. 10 2004 032 914.1 filed Jul. 7, 2004, both of the applications are incorporated by reference herein in their entirety.

FIELD OF THE INVENTION

The invention relates to a method for determining a transformation of coordinates of different images of an object, in which landmarks assigned to each other are searched for and the coordinate information is computed with the aid of the image coordinates of the landmarks.

BACKGROUND OF THE INVENTION

These types of method are generally known in the area of medical technology. They are especially used to align images which were obtained using different examination methods. The images involved can be both volume images and also projection images. For example the image of a patient that has been recorded with a computer tomography device can be placed over a further image created using magnetic resonance tomography. The combination of a fluorescence image with an image created with the aid of a computer tomograph represents a further example.

The calculation of the necessary transformation of coordinates is also referred to as registration. The presentation of the registered image data is also called fusion. The registration and the fusion can be undertaken with image data of the same or different modalities. Modality in this case is understood as the way in which the data is obtained. Image data of the same modality has especially been recorded with the same diagnosis device.

The image data of the same or different modalities can be registered the aid of orientation aids (=landmarks). These orientation aids, which are also referred to as landmarks, can be easily identifiable areas of the mapped object or additional markings (=fiducials) attached to the object.

There are also methods which are oriented to the overall structure of the mapped object. These methods include methods with visual position alignment and methods which compute the correlations between the voxels of the images to be registered as well as methods which are oriented to the surface of the mapped object. Voxels here are to be understood as picture elements of a volume image.

For the registration of image data a certain number of degrees of freedom of a transformation matrix are defined, which map each image coordinate of the one image onto an assigned image coordinate of the other image. The one image is referred to below as the model image and the other image as the reference image.

If the landmarks can be found in the image data, the transformation matrix can be computed in a simple manner by solving a linear equation system. To this extent no error-prone or long-winded optimization processes are necessary. In addition the transformation matrix can be calculated within a short time.

A disadvantage of the landmark-based calculation of the transformation matrix is that the landmarks are frequently unable to be found in the images. This leads to inaccuracies in the registration.

SUMMARY OF THE INVENTION

Using this prior art as its point of departure, the object of the invention is to create an improved method for registration of images.

This object is achieved by a method with the features of the independent claim. Advantageous embodiments and developments are specified in its dependent claims.

The method involves initially searching for at least one pair of landmarks assigned to each other. Subsequently the position of the object contained in the different images is determined in relation to the remaining degrees of freedom with the aid of a position alignment not based on the landmarks. The transformation of coordinates can finally be computed with the information thus obtained.

In the method the information contained in the landmarks is effectively used for the position alignment. By comparison with conventional landmark-based methods however the method does not fail even if the landmarks cannot be completely found. Thus the method uses the information offered by the landmarks as far as possible but obtains the missing information using a method which is not dependent on landmarks.

The method is not restricted to position alignment between volume images, but can also be used for position alignment of projection images. It is also possible to match the projection of a volume image with a projection image.

Preferably the position alignment not based on the landmarks is undertaken by looking for an extreme value of a characteristic dimension for the correlation between the images. In this case the non-landmark-based position alignment can be automated.

This part of the method can however also be performed if a user, on the basis of images shown on a display, looks for a transformation of coordinates which leads to the greatest possible match.

BRIEF DESCRIPTION OF THE DRAWINGS

Further advantages and details can be taken from the description below, in which the exemplary embodiments of the invention are explained in detail on the basis of the enclosed drawing. The figures show.

DETAILED DESCRIPTION OF THE INVENTION

Figure 1:
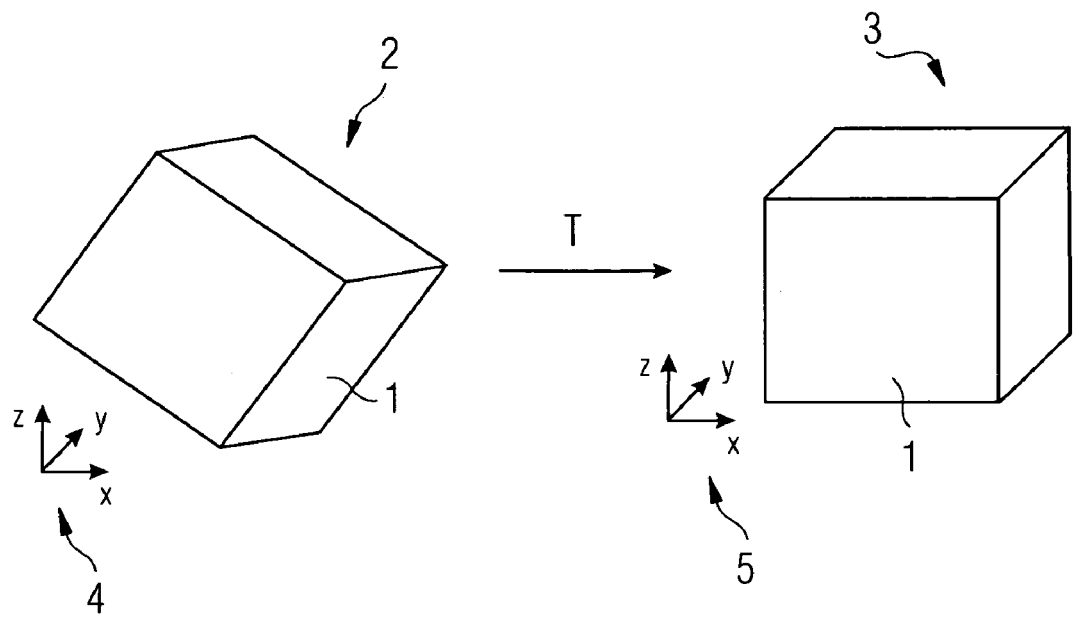
FIG. 1 two images with different views of an object, whereby a position alignment between the images is to be undertaken.

FIG. 1 shows an object 1 contained in different volume images 2 and 3. The volume images 2 and 3 are related to coordinate systems 4 and 5. The position of the object 1 in the volume images 2 and 3 can be different in relation to the coordinate systems 4 and 5. If the volume images 2 and 3 are then to be aligned in order to facilitate diagnosis for the medical personnel, a transformation of coordinates T must be found through which the image coordinates of the object 1 in the volume image 2 can be transformed into the image coordinates of the object 1 in the volume image 3. In homogeneous coordinates the shape of the transformation matrix is for example as follows:

$$T = \begin{pmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{pmatrix}$$

The elements of the transformation matrix $r_{11}$ to $r_{33}$ describe a rotation of the object 1 in relation to the coordinate axes of the coordinate system 4 or 5. The elements of the transformation matrix $t_x$ to $t_z$ describes a translation that may be required along the coordinate axes of the coordinate system 4 or 5.

It should be noted that the volume images 2 and 3 are usually stored in DICOM format for medical applications. The DICOM format prescribes a uniform scale for the volume images 2 and 3. It is thus not generally necessary to undertake a stretching to align volume image 2 to volume image 3.

To compute the transformation of coordinate information about three degrees of freedom of the translation and three degrees of freedom of the rotation is needed. Overall six degrees of freedom are thus available.

Figure 2:
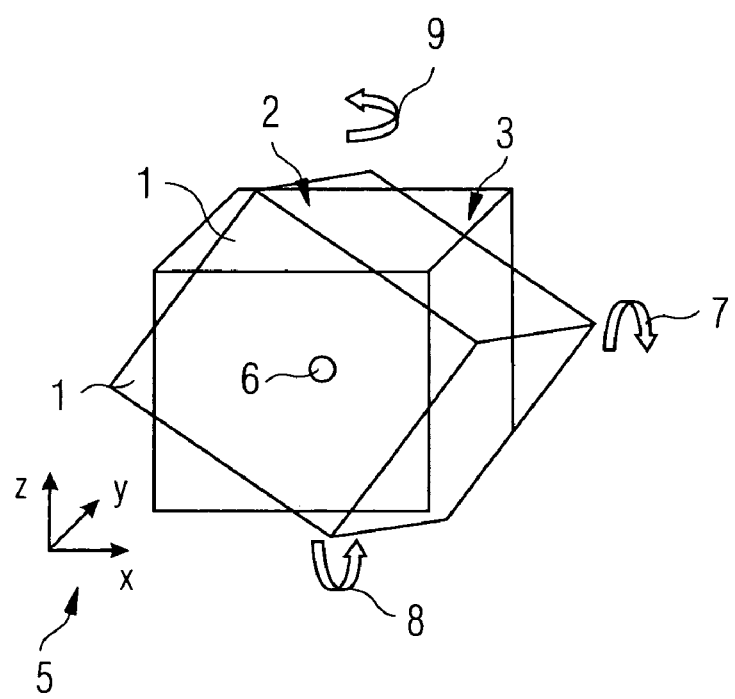
FIG. 2 a diagram with the transformations executed in a first exemplary embodiment of the method for position alignment.

The transformation matrix T can now be determined as follows. As shown in FIG. 2, a landmark 6 can be contained both in the volume image 2 and also in the volume image 3 respectively and can be easily identified both in volume image 2 and also in volume image 3. The landmark 6 which can be found both in volume image 2 and also in volume image 3 can then be used directly to eliminate the degrees of freedom in relation to the translation. This means that the three translational elements $t_x$ to $t_z$ of the transformation matrix T are already known. As the method proceeds only information regarding the three degrees of freedom of the rotation still needs to be obtained, so that the remaining rotational elements $r_{11}$ to $r_{33}$ can be computed.

The three rotational degrees of freedom are illustrated in FIG. 2 by rotations 7, 8 and 9 around the x-axis, y-axis and the z-axis of the coordinate system 5. The rotations 7, 8 and 9 are those rotations by which the image data of the volume image 2 is rotated around the axes of the coordinate system 5.

The volume image 2 is also called the model volume image and the volume image 3 is called the reference volume image. The process by which the transformation matrix T is determined is called registration. Finally, the application of the transformation matrix T to the image data of the volume image 2 is called fusion.

Different registration methods which do not rely on landmarks can be used for determining the rotational elements of the transformation matrix T.

For example the remaining registration after the landmark 6 has been found can be undertaken using an automatic registration method which evaluates the voxels of the volume images 2 and 3. Typically a dimension which is characteristic for the correlation between the image data of the volume images 2 and 3 is used in this case. This can for example be a coefficient of correlation which has been computed on the basis of grey values.

The registration in relation to the rotational elements of the transformation matrix T can also be undertaken by a registration method which is oriented to the surface of object 1. In addition registration processes are considered, in which a user modifies the volume images 2 and 3 displayed on the screen until such time as a sufficient match is achieved.

After the registration of the rotational elements of the transformation matrix T a registration method which is not based on landmarks and which manages without using the pairs of landmarks 6 identified at the start can again be applied to the image data. The renewed use of the non-landmark-based registration method enables the previous result to be optimized or verified.

Figure 3:
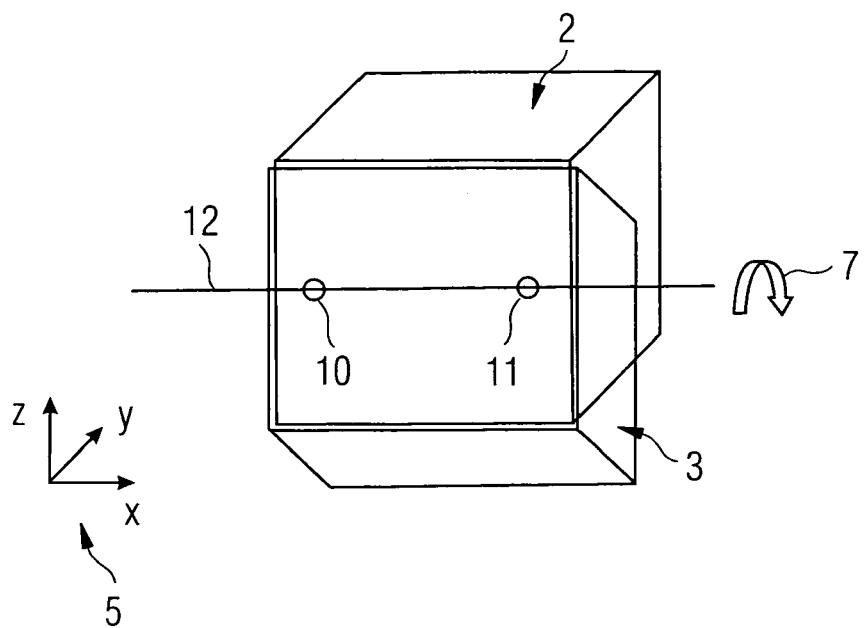
FIG. 3 a diagram with the transformations executed in a further exemplary embodiment of the invention for position alignment.

FIG. 3 shows a further registration method, in which, after the identification of two pairs of landmarks 10 and 11, the three translational elements $t_x$ to $t_z$ are known. The rotational elements of the transformation matrix T are also largely defined since only one degree of freedom remains in relation to rotation 7 around an axis of rotation 12 defined by the landmark pairs 10 and 11. The angle of rotation around the axis of rotation 12 still unknown after the identification of the landmark pairs 10 and 11 is determined by a registration method which is not landmark-based. This can be done both manually and automatically. Furthermore surface-oriented or volume-oriented registration methods can be used. It is further possible to improve the result of the registration by a further registration method which is not based on landmarks and does not use the initially identified pairs of landmarks 10 and 11.

Figure 4:
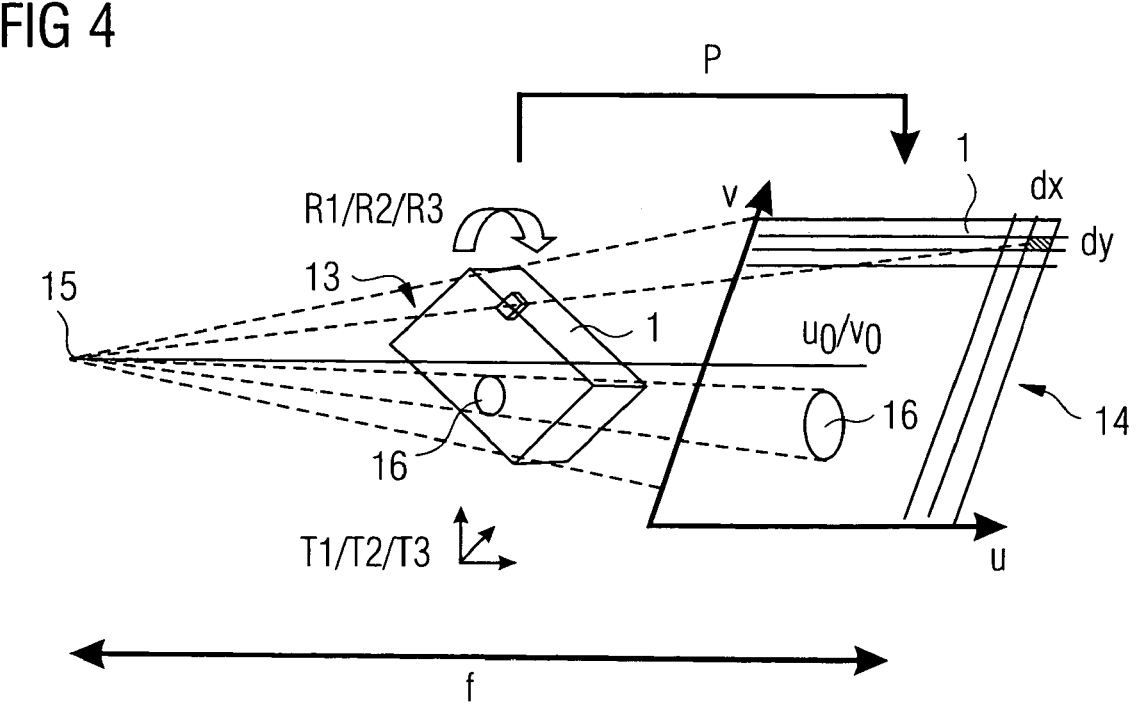
FIG. 4 a diagram of a further embodiment of the invention, in which the positions of the projection of a volume image and a projection image are aligned.

The method described with reference to FIGS. 2 and 3 can also be applied to projection images or to a combination of projection images with projection of volume images. Such a registration method is shown in FIG. 4. For the registration method shown in FIG. 4 the registration of a volume image 13 with a projection image 14 is shown. The transformation matrix P generally has the form:

$$P = \begin{pmatrix} f/d_x & f*s & u_0 & 0 \\ 0 & f/d_y & v_0 & 0 \\ 0 & 0 & 1 & 0 \\ 0 & 0 & 0 & 1 \end{pmatrix} * \begin{pmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{pmatrix}$$

11 degrees of freedom are to be taken into account in computing the transformation matrix P: six intrinsic and five extrinsic. The extrinsic degrees of freedom relate to the translation T1, T2 and T3 in the direction of an x-axis, a y-axis and a z-axis and to the rotations R1, R2 and R3 around the x-axis, y-axis and the z-axis. The intrinsic degrees of freedom are the degrees of freedom of the projection. In particular the quotients $f/d_x$, $f/d_y$, the product $f*s$ as well as $u_0$ and $v_0$ are designated as degrees of freedom. The variable f in this case is the distance f between the one projection center 15 and the projection image 14, $d_x$ and $d_y$ the pixel size in the projection image 14, s a stretching factor and $u_0$ and $v_0$ the coordinates of the so-called piercing point.

The task of registration is also simplified in this case if the positional information communicated by a landmark 16 is evaluated first. This is because four pairs of landmarks are required in principle for known intrinsic parameters in order to determine the position of the object 1 in relation to the six extrinsic degrees of freedom. In the case of unknown intrinsic parameters six pairs of landmarks are necessary in order to define the eleven degrees of freedom. Even if fewer than four or fewer than six pairs of landmarks are identified, the identified landmarks can be used to reduce the number of degrees of freedom, which makes the registration easier. The identification of the landmark 16 enables the remaining registration process to be performed more easily manually at a display unit and the optimization effort and thereby the computing time and the susceptibility to errors of optimizing registration methods which are based on voxels or surfaces falls with the reduction of the degrees of freedom to be determined.

The outstanding feature of the methods described here is thus that a number of landmarks are first identified in the images to be registered. The number of the landmarks is not sufficient however to form an equation system of which the solution is the transformation matrix sought. Following on from the identification of the landmarks the remaining degrees of freedom to be determined are defined by interactive, semiautomatic or fully automatic registration methods. These registration methods can be a visual position alignment, a surface scan matching or a fully automatic registration method, for example a registration method based on the evaluation of voxels.

Finally, in a third method step, using a non-landmark-based registration method, for example by an automatic registration based on voxels, the preceding result can be optimized or verified without using the landmarks identified at the start. A function can also be provided in a device for executing the method which cancels the last method step.

The invention claimed is:

1. A method for determining a transformation of coordinates of a plurality of different images of an object, comprising:
   assigning a landmark to the object;
   identifying the landmark in the different images of the object;
   determining elements in a transformation matrix based on the landmark;
   determining remaining elements in the transformation matrix with a position alignment not based on the landmark if the landmark is not found or the remaining elements cannot be determined by the landmark; and
   computing the transformation of coordinates using the transformation matrix.

2. The method as claimed in claim 1, wherein the position alignment is oriented to an overall structure of the object.

3. The method as claimed in claim 1, wherein the position alignment is oriented to a volume of the object mapped in the images.

4. The method as claimed in claim 1, wherein the position alignment is oriented to a surface of the object mapped in the images.

5. The method as claimed in claim 1, wherein the transformation of coordinates is computed between volume images.

6. The method as claimed in claim 1, wherein the transformation of coordinates is computed between projection images.

7. The method as claimed in claim 1, wherein the transformation of coordinates is computed between a projection of a volume image and a projection image.

8. The method as claimed in claim 1, wherein a position of the object is aligned by the transformation of coordinates.

9. The method as claimed in claim 8, wherein a characteristic measure for a correlation between the images is optimized through the alignment.

10. The method as claimed in claim 1, wherein the position alignment is performed manually by a use matching positions of the images of the object at a display unit.

11. The method as claimed in claim 1, wherein the position alignment is performed automatically by evaluating voxels of the images of the object for a correlation between the images.

12. The method as claimed in claim 1, wherein the landmark is identified automatically.

13. The method as claimed in claim 1, wherein the landmarks is identified by a user at a display unit.

14. The method as claimed in claim 1, wherein the object is a patient.

15. The method as claimed in claim 1, wherein the transformation of coordinates is optimized or verified by determining all elements in the transformation matrix with the position alignment not based on the landmark.

16. A device for determining a transformation of coordinates of a plurality of different images of an object having a landmark, the landmark being identified in the different images, comprising:
   a display unit that displays the different images; and
   a computing unit that computes the transformation of coordinates by determining a transformation matrix,
   wherein the transformation matrix comprises elements based on the landmark and elements determined by a position alignment not based on the landmark if the landmark is not found or the remaining elements cannot be determined by the landmark.

* * * * *